US011862795B2

(12) United States Patent
Erk et al.

(10) Patent No.: US 11,862,795 B2
(45) Date of Patent: Jan. 2, 2024

(54) METHOD FOR PROCESSING NI-RICH ELECTRODE ACTIVE MATERIALS

(71) Applicant: BASF SE, Ludwigshafen am Rhein (DE)

(72) Inventors: Christoph Erk, Ludwigshafen (DE); Thomas Letzelter, Ludwigshafen (DE); Markus Hoelzle, Ludwigshafen (DE); Carsten Sueling, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 568 days.

(21) Appl. No.: 17/254,559

(22) PCT Filed: Jun. 17, 2019

(86) PCT No.: PCT/EP2019/065862
§ 371 (c)(1),
(2) Date: Dec. 21, 2020

(87) PCT Pub. No.: WO2020/002024
PCT Pub. Date: Jan. 2, 2020

(65) Prior Publication Data
US 2021/0376318 A1 Dec. 2, 2021

(30) Foreign Application Priority Data
Jun. 28, 2018 (EP) .................................. 18180290

(51) Int. Cl.
H01M 4/525 (2010.01)
C01G 53/00 (2006.01)
H01M 4/505 (2010.01)
H01M 4/02 (2006.01)

(52) U.S. Cl.
CPC ............ H01M 4/525 (2013.01); C01G 53/50 (2013.01); H01M 4/505 (2013.01); *C01P 2002/52* (2013.01); *C01P 2006/12* (2013.01); *C01P 2006/40* (2013.01); *H01M 2004/021* (2013.01); *H01M 2004/028* (2013.01)

(58) Field of Classification Search
CPC ..... C01G 53/42; C01G 53/50; C01P 2002/52; C01P 2006/12; C01P 2006/40; C01P 2006/80; H01M 2004/021; H01M 2004/028; H01M 4/505; H01M 4/525; Y02E 60/10
See application file for complete search history.

(56) References Cited

U.S. PATENT DOCUMENTS

| 8,187,747 | B2 | 5/2012 | Abe et al. | |
|---|---|---|---|---|
| 8,993,051 | B2 | 3/2015 | Kelder et al. | |
| 2014/0087262 | A1 | 3/2014 | Imahashi et al. | |
| 2015/0010819 | A1* | 1/2015 | Lee .................... | H01M 4/505 429/223 |
| 2015/0372300 | A1 | 12/2015 | Imaizumi et al. | |
| 2016/0013486 | A1 | 1/2016 | Hirai et al. | |
| 2018/0145324 | A1 | 5/2018 | Liu et al. | |
| 2019/0288284 | A1 | 9/2019 | Otterstedt | |

FOREIGN PATENT DOCUMENTS

| EP | 2 698 351 A1 | 2/2014 | | |
|---|---|---|---|---|
| EP | 2 824 735 A2 | 1/2015 | | |
| EP | 2 963 707 A1 | 1/2016 | | |
| EP | 3 490 041 A1 | 5/2019 | | |
| JP | 2007273108 A | 10/2007 | | |
| JP | 2009099523 A | 5/2009 | | |
| JP | 4789066 B2 | 10/2011 | | |
| JP | 5139024 B2 | 2/2013 | | |
| JP | 2013125732 A | 6/2013 | | |
| JP | 2017-188294 A | 10/2017 | | |
| JP | 2018073654 A | 5/2018 | | |
| KR | 10-2017-0076222 A | 7/2017 | | |
| WO | WO 2018/016525 A1 | 1/2018 | | |
| WO | WO-2018016525 A1 * | 1/2018 | ............. | C01G 53/00 |
| WO | WO 2018/038509 A1 | 3/2018 | | |

OTHER PUBLICATIONS

Extended European Search Report dated Apr. 8, 2019 in European Patent Appiication No. 18180290.1, 4 pages.
International Search Report dated Nov. 13, 2019 in PCT/EP2019/065862 filed on Jun. 17, 2019.
International Preliminary Report on Patentability dated Nov. 25, 2020 in PCT/EP2019/065862 filed on Jun. 17, 2019.

* cited by examiner

Primary Examiner — Mark Kopec
Assistant Examiner — Jaison P Thomas
(74) Attorney, Agent, or Firm — Armstrong Teasdale LLP

(57) ABSTRACT

Process for modifying an electrode active material according to general formula $Li_{1+x}TM_{1-x}O2$, wherein TM contains a combination of Ni and at least one transition metal selected from Co and Mn, and, optionally, at least one metal selected from Al, Ba, and Mg and, optionally, one or more transition metals other than Ni, Co, and Mn, wherein at least 75 mole-% of TM is Ni, and x is in the range of from −0.05 to 0.2, said process comprising the steps of (a) treating said $Li_{1+x}TM_{1-x}O2$ with an aqueous medium with a pH value of at least 5 and up to 14, (b) removing said aqueous medium from treated $Li_{1+x}TM_{1-x}O2$ by way of a solid-liquid separation, wherein steps (a) and (b) are commenced with a maximum time difference of 3 minutes. In addition, the present invention is directed towards Ni-rich electrode active materials.

8 Claims, No Drawings

METHOD FOR PROCESSING NI-RICH ELECTRODE ACTIVE MATERIALS

The present invention is directed towards a process for modifying an electrode active material according to general formula $Li_{1+x}TM_{1-x}O_2$, wherein TM is a combination of metals according to general formula (I a) or (I b)

$$(Ni_aCo_bMn_c)_{1-d}M^1_d \quad \text{(I a)}$$

with a+b+c=1 and
a being in the range of from 0.75 to 0.95,
b being in the range of from 0.025 to 0.2,
c being in the range of from 0.025 to 0.2,
d being in the range of from zero to 0.1, and
$M^1$ is at least one of Ba, Mg, Al, W, Mo, Ti or Zr, $$(Ni_aCo_bAl_e)_{1-d}M^2_d \quad \text{(I b)}$$

with a+b+c=1 and
a being in the range of from 0.75 to 0.95,
b being in the range of from 0.025 to 0.2,
e being in the range of from 0.025 to 0.2,
d being in the range of from zero to 0.1,
$M^2$ is at least one of W, Mo, Ti or Zr,
and x is in the range of from −0.05 to +0.2, said process comprising the steps of
(a) treating said $Li_{1+x}TM_{1-x}O_2$ with an aqueous medium with a pH value in the range of from 5 to 14,
(b) removing said aqueous medium from treated $Li_{1+x}TM_{1-x}O_2$ by way of a solid-liquid separation,
wherein steps (a) and (b) are commenced with a maximum time difference of 3 minutes.

In addition, the present invention is directed towards Ni-rich electrode active materials.

Lithium ion secondary batteries are modern devices for storing energy. Many application fields have been and are contemplated, from small devices such as mobile phones and laptop computers through car batteries and other batteries for e-mobility. Various components of the batteries have a decisive role with respect to the performance of the battery such as the electrolyte, the electrode materials, and the separator. Particular attention has been paid to the cathode materials. Several materials have been suggested, such as lithium iron phosphates, lithium co-bait oxides, and lithium nickel cobalt manganese oxides. Although extensive research has been performed the solutions found so far still leave room for improvement.

Currently, a certain interest in so-called Ni-rich electrode active materials may be observed, for example electrode active materials that contain 75 mole-% or more of Ni, referring to the total TM content.

One problem of lithium ion batteries—especially of Ni-rich electrode active materials—is attributed to undesired reactions on the surface of the electrode active materials. Such reactions may be a decomposition of the electrolyte or the solvent or both. It has thus been tried to protect the surface without hindering the lithium exchange during charging and discharging. Examples are attempts to coat the electrode active materials with, e.g., aluminium oxide or calcium oxide, see, e.g., U.S. Pat. No. 8,993,051.

Other theories assign undesired reactions to free LiOH or $Li_2CO_3$ on the surface. Attempts have been made to remove such free LiOH or $Li_2CO_3$ by washing the electrode active material with water, see, e.g., JP 4,789,066 B, JP 5,139,024 B, and US2015/0372300. However, in some instances it was observed that the properties of the resultant electrode active materials did not improve.

It was an objective of the present invention to provide a process for making Ni-rich electrode active materials with excellent electrochemical properties. It was also an objective to provide Ni-rich electrode active materials with excellent electrochemical properties.

Accordingly, the process defined at the outset has been found, hereinafter also referred to as "inventive process". We found that too long an interaction of water with a Ni-rich electrode active material may lead to a very strong lithium depletion.

The inventive process is a process for modifying an electrode active material according to general formula $Li_{1+x}TM_{1-x}O_2$, wherein TM is a combination of metals according to general formula (I a) or (I b) said process comprising the steps of
(a) treating said $Li_{1+x}TM_{1-x}O_2$ with an aqueous medium with a pH value in the range of from 5 to 14,
(b) removing said aqueous medium from treated $Li_{1+x}TM_{1-x}O_2$ by way of a solid-liquid separation,
wherein steps (a) and (b) are commenced with a maximum time difference of 3 minutes.

The inventive process is described in more detail below.

The inventive process comprises two steps, (a) and (b), in the context of the present invention also referred to as step (a) and step (b). The commencement of steps (a) and (b) may be simultaneously or preferably subsequently. Steps (a) and (b) may be performed simultaneously or subsequently or, preferably, at least partially overlapping or simultaneously.

The inventive process starts off from an electrode active material according to general formula $Li_{1+x}TM_{1-x}O_2$, wherein TM contains a combination of Ni and at least one transition metal selected from Co and Mn, and, optionally, at least one metal selected from Al, Ba, and Mg and, optionally, one or more transition metals other than Ni, Co, and Mn, wherein at least 75 mole-% of TM is Ni, preferably at least 80 mole-%, and x is in the range of from −0.05 to 0.2. Said material is hereinafter also referred to as starting material.

In one embodiment of the present invention the starting material has an average particle diameter (D50) in the range of from 3 to 20 μm, preferably from 5 to 16 μm. The average particle diameter can be determined, e. g., by light scattering or LASER diffraction or electroacoustic spectroscopy. The particles are usually composed of agglomerates from primary particles, and the above particle diameter refers to the secondary particle diameter.

In one embodiment of the present invention, the starting material has a specific surface (BET), hereinafter also referred to as "BET surface", in the range of from 0.1 to 1.0 $m^2/g$. The BET surface may be determined by nitrogen adsorption after outgassing of the sample at 200° C. for 30 minutes or more and beyond this accordance with DIN ISO 9277:2010.

Some elements are ubiquitous. In the context of the present invention, traces of ubiquitous metals such as sodium, calcium, iron or zinc, as impurities will not be taken into account in the description of the present invention. Traces in this context will mean amounts of 0.05 mol-% or less, referring to the total metal content of the starting material.

In one embodiment of the present invention, the variable TM corresponds to general formula (I a)

$$(Ni_aCo_bMn_c)_{1-d}M^1_d \quad \text{(I a)}$$

with a+b+c=1 and a being in the range of from 0.75 to 0.95, preferably from 0.85 to 0.95, b being in the range of from 0.025 to 0.2, preferably from 0.025 to 0.1, c being in the range of from 0.025 to 0.2, preferably 0.05 to 0.1, d being in the range of from zero to 0.1, preferably from zero to 0.04, $M^1$ is at least one of Al, Mg, W, Mo, Ti or Zr, preferably at least one of Al, Ti and W.

The variable x is in the range of from −0.05 to 0.2.

In one embodiment of the present invention TM corresponds to general formula (I a) and x is in the range from zero to 0.2, preferably from zero to 0.1 and even more preferably 0.01 to 0.05.

In one embodiment of the present invention TM corresponds to general formula (I b) and x is in the range of from −0.05 to zero.

The starting material is usually free from conductive carbon, that means that the conductive carbon content of starting material is less than 1% by weight, referring to said starting material, preferably 0.001 to 1.0% by weight.

In step (a), said starting material is treated with an aqueous medium with a pH value in the range of from 5 up to 14, more preferably from 7 to 12.5 and even more preferably from 8 to 12.5. The pH value is measured at the beginning of step (a). It is observed that in the course of step (a), the pH value raises to at least 10.

It is preferred that the water hardness of aqueous medium and in particular of the water used for step (a) is at least partially removed, especially calcium. The use of desalinized water is preferred.

In an alternative embodiment of step (a), the aqueous medium used in step (a) may contain ammonia or at least one transition metal salt, for example a nickel salt or a cobalt salt. Such transition metal salts preferably bear counterions that are not detrimental to an electrode active material. Sulfate and nitrate are feasible. Chloride is not preferred.

In one embodiment of step (a), the aqueous medium used in step (a) contains 0.001 to 10% by weight of an oxide or hydroxide or oxyhydroxide of Al, Mo, W, Ti, or Zr. In another embodiment of step (a), the aqueous medium used in step (a) contain does not contain measurable amounts of any of oxides or hydroxides or oxyhydroxides of Al, Mo, W, Ti, or Zr.

In one embodiment of the present invention, step (a) is performed at a temperature in the range of from 5 to 65° C., preferred are 10 to 35° C.

In one embodiment of the present invention, step (a) is performed at normal pressure. It is preferred, though, to perform step (a) under elevated pressure, for example at 10 mbar to 10 bar above normal pressure, or with suction, for example 50 to 250 mbar below normal pressure, preferably 100 to 200 mbar below normal pressure.

Step (a) may be performed, for example, in a vessel that can be easily discharged, for example due to its location above a filter device. Such vessel may be charged with starting material followed by introduction of aqueous medium. In another embodiment, such vessel is charged with aqueous medium followed by introduction of starting material. In another embodiment, starting material and aqueous medium are introduced simultaneously.

In one embodiment of the present invention, the volume ratio of starting material and total aqueous medium in step (a) is in the range of from 2:1 to 1:5, preferably from 2:1 to 1:2.

Step (a) may be improved by mixing operations, for example shaking or in particular by stirring or shearing, see below.

In one embodiment of the present invention, step (a) has a duration in the range of from 1 minute to 30 minutes, preferably 1 minute to less than 5 minutes. A duration of 5 minutes or more is possible in embodiments wherein steps (a) and (b) are performed overlapping or simultaneously.

At the latest 3 minutes after commencement of step (a), step (b) is started. Step (b) includes removing said aqueous medium from treated $Li_{1+x}TM_{1-x}O_2$ by way of a solid-liquid separation, for example by decanting or preferably by filtration.

In one embodiment of the present invention, the slurry obtained in step (a) is discharged directly into a centrifuge, for example a decanter centrifuge or a filter centrifuge, or on a filter device, for example a suction filter or in a belt filter that is located preferably directly below the vessel in which step (a) is performed. Then, filtration is commenced.

In a particularly preferred embodiment of the present invention, steps (a) and (b) are performed in a filter device with stirrer, for example a pressure filter with stirrer or a suction filter with stirrer.

At most 3 minutes after—or even immediately after—having combined starting material and aqueous medium in accordance with step (a), removal of aqueous medium is commenced by starting the filtration. On laboratory scale, steps (a) and (b) may be performed on a Buchner funnel, and step (a) may be supported by manual stirring.

In a preferred embodiment, step (a) is performed in a filter device, for example a stirred filter device that allows stirring of the slurry in the filter or of the filter cake. By commencement of the filtration, for example pressure filtration or suction filtration, after a maximum time of 3 minutes after commencement of step (a), step (b) is started.

In one embodiment of the present invention, step (b) has a duration in the range of from 1 minute to 27 minutes.

In one embodiment of the present invention, stirring in step (b) is performed with a rate in the range of from 1 to 50 rounds per minute ("rpm"), preferred are 5 to 20 rpm.

It is preferred to perform steps (a) and (b) at the same temperature.

It is preferred to perform steps (a) and (b) at the same pressure, or to increase the pressure when starting step (b).

In one embodiment of the present invention, filter media for step (b) may be selected from ceramics, sintered glass, sintered metals, organic polymer films, non-wovens, and fabrics.

In one embodiment of the present invention, steps (a) and (b) are carried out under an atmosphere with reduced $CO_2$ content, e.g., a carbon dioxide content in the range of from 0.01 to 500 ppm by weight, preferred are 0.1 to 50 ppm by weight. The $CO_2$ content may be determined by, e.g., optical methods using infrared light. It is even more preferred to perform steps (a) and (b) under an atmosphere with a carbon dioxide content below detection limit for example with infrared-light based optical methods.

In one embodiment of the present invention, the inventive process comprises a subsequent step (c):

(c) thermal treatment of the material treated according to measures (a) and (b) at a temperature in the range of from 350 to 900° C., preferably 550 to 750° C.

Step (c) may be carried out in any type of oven, for example a roller hearth kiln, a pusher kiln, a rotary kiln, a pendulum kiln, or—for lab scale trials—in a muffle oven.

The temperature of 350 to 900° C. corresponds to the maximum temperature of step (c).

It is possible to subject the material obtained from step (b) directly to step (c). However, it is preferred to increase the temperature stepwise, or to ramp up the temperature, or to dry the material obtained after step (b) at first at a temperature in the range of from 100 to 250° C. before subjecting it to step (c). Said step-wise increase or ramping up may be performed under normal pressure or reduced pressure, for example 1 to 500 mbar.

Step (c)—at the maximum temperature—may be performed under normal pressure.

In one embodiment of the present invention, step (c) is carried out under an oxygen-containing atmosphere, for example air, oxygen-enriched air or pure oxygen.

In embodiments wherein a drying at a temperature in the range of from 100 to 250° C. prior to step (c) is performed such drying may be performed with a duration of from 10 minutes to 5 hours.

In one embodiment of the present invention, step (c) is carried out under an atmosphere with reduced $CO_2$ content, e.g., a carbon dioxide content in the range of from 0.01 to 500 ppm by weight, preferred are 0.1 to 50 ppm by weight. The $CO_2$ content may be determined by, e.g., optical methods using infrared light. It is even more preferred to perform step (c) under an atmosphere with a carbon dioxide content below detection limit for example with infrared-light based optical methods.

In one embodiment of the present invention step (c) has a duration in the range of from 1 to 10 hours, preferably 90 minutes to 6 hours.

In one embodiment of the present invention, the lithium content of an electrode active material is reduced by 1 to 5% by weight, preferably 2 to 4%. Said reduction mainly affects the so-called residual lithium.

By carrying out the inventive process, electrode active materials are obtained with excellent electrochemical properties. Without wishing to be bound by any theory, we assume that the short interaction time of aqueous medium with the electrode active material leads to the prevention of detrimental effects of the water.

A further aspect of the present invention relates to electrode active materials, hereinafter referred to inventive electrode active materials. Inventive electrode active materials may be obtained in accordance with the inventive process. Inventive electrode active material according to general formula $Li_{1+x1}TM_{1-x1}O_2$, wherein TM contains a combination of Ni and at least one transition metal selected from Co and Mn, and, optionally, at least one metal selected from Al, Ba, and Mg, and, optionally, one or more transition metals other than Ni, Co, and Mn, wherein at least 75 mole-% of TM is Ni, and x1 is in the range of from −0.01 to 0.1, with a specific surface (BET) in the range of from 0.6 to 0.8 $m^2/g$.

The specific surface (BET) can be determined by nitrogen absorption, for example according to DIN 66131.

In a preferred embodiment, the variable TM corresponds to general formula (I a)

with a+b+c=1 and a being in the range of from 0.75 to 0.95, preferably from 0.85 to 0.95, b being in the range of from 0.025 to 0.2, preferably from 0.025 to 0.1, c being in the range of from 0.025 to 0.2, preferably 0.05 to 0.1, d being in the range of from zero to 0.1, preferably from zero to 0.04, $M^1$ is at least one of Al, Mg, W, Mo, Ti or Zr, preferably at least one of Al, Ti and W.

In another preferred embodiment, the variable TM corresponds to general formula (I b)

with a*+b*+c*=1 and a* being in the range of from 0.75 to 0.95, preferably from 0.88 to 0.95, b* being in the range of from 0.025 to 0.2, preferably from 0.025 to 0.1, e* being in the range of from 0.01 to 0.2, preferably from 0.015 to 0.04, d* being in the range of from zero to 0.1, preferably from zero to 0.02, $M^2$ is at least one of W, Mo, Ti or Zr.

In one embodiment of the present invention, inventive electrode active materials have a residual lithium content, expressed as residual lithium hydroxide (LiOH) and residual lithium carbonate ($Li_2CO_3$), in the range from 0.05 to 0.30 by weight of LiOH and 0.05 to 0.30% by weight of $Li_2CO_3$, determined by titration.

In one embodiment of the present invention inventive electrode active material has an average particle diameter (D50) in the range of from 3 to 20 μm, preferably from 5 to 16 μm. The average particle diameter can be determined, e. g., by light scattering or LASER diffraction or electroacoustic spectroscopy. The particles are usually composed of agglomerates from primary particles, and the above particle diameter refers to the secondary particle diameter.

Inventive electrode active materials are very well suited for cathodes in lithium ion batteries. They exhibit a low resistance build-up in the cause of repeated cycling, for example 500 or more cycles.

A further aspect of the present invention refers to electrodes comprising at least one electrode material active according to the present invention. They are particularly useful for lithium ion batteries. Lithium ion batteries comprising at least one electrode according to the present invention exhibit a good discharge behavior. Electrodes comprising at least one electrode active material according to the present invention are hereinafter also referred to as inventive cathodes or cathodes according to the present invention.

Cathodes according to the present invention can comprise further components. They can comprise a current collector, such as, but not limited to, an aluminum foil. They can further comprise conductive carbon and a binder.

Suitable binders are preferably selected from organic (co)polymers. Suitable (co)polymers, i.e. homopolymers or copolymers, can be selected, for example, from (co)polymers obtainable by anionic, catalytic or free-radical (co)polymerization, especially from polyethylene, polyacrylonitrile, polybutadiene, polystyrene, and copolymers of at least two comonomers selected from ethylene, propylene, styrene, (meth)acrylonitrile and 1,3-butadiene. Polypropylene is also suitable. Polyisoprene and polyacrylates are additionally suitable. Particular preference is given to polyacrylonitrile.

In the context of the present invention, polyacrylonitrile is understood to mean not only polyacrylonitrile homopolymers but also copolymers of acrylonitrile with 1,3-butadiene or styrene. Preference is given to polyacrylonitrile homopolymers.

In the context of the present invention, polyethylene is not only understood to mean homo-polyethylene, but also copolymers of ethylene which comprise at least 50 mol % of copolymerized ethylene and up to 50 mol % of at least one further comonomer, for example α-olefins such as propylene, butylene (1-butene), 1-hexene, 1-octene, 1-decene, 1-dodecene, 1-pentene, and also isobutene, vinylaromatics, for example styrene, and also (meth)acrylic acid, vinyl acetate, vinyl propionate, $C_1$-$C_{10}$-alkyl esters of (meth) acrylic acid, especially methyl acrylate, methyl methacrylate, ethyl acrylate, ethyl methacrylate, n-butyl acrylate, 2-ethylhexyl acrylate, n-butyl methacrylate, 2-ethylhexyl methacrylate, and also maleic acid, maleic anhydride and itaconic anhydride. Polyethylene may be HDPE or LDPE.

In the context of the present invention, polypropylene is not only understood to mean homopolypropylene, but also copolymers of propylene which comprise at least 50 mol % of copolymerized propylene and up to 50 mol % of at least one further comonomer, for example ethylene and α-olefins such as butylene, 1-hexene, 1-octene, 1-decene, 1-dodecene and 1-pentene. Polypropylene is preferably isotactic or essentially isotactic polypropylene.

In the context of the present invention, polystyrene is not only understood to mean homopolymers of styrene, but also copolymers with acrylonitrile, 1,3-butadiene, (meth)acrylic acid, $C_1$-$C_{10}$-alkyl esters of (meth)acrylic acid, divinylbenzene, especially 1,3-divinylbenzene, 1,2-diphenylethylene and α-methylstyrene.

Another preferred binder is polybutadiene.

Other suitable binders are selected from polyethylene oxide (PEO), cellulose, carboxymethylcellulose, polyimides and polyvinyl alcohol.

In one embodiment of the present invention, binder is selected from those (co)polymers which have an average molecular weight $M_w$ in the range from 50,000 to 1,000,000 g/mol, preferably to 500,000 g/mol.

Binder may be cross-linked or non-cross-linked (co) polymers.

In a particularly preferred embodiment of the present invention, binder is selected from halogenated (co)polymers, especially from fluorinated (co)polymers. Halogenated or fluorinated (co)polymers are understood to mean those (co)polymers which comprise at least one (co)polymerized (co)monomer which has at least one halogen atom or at least one fluorine atom per molecule, more preferably at least two halogen atoms or at least two fluorine atoms per molecule. Examples are polyvinyl chloride, polyvinylidene chloride, polytetrafluoroethylene, polyvinylidene fluoride (PVdF), tetrafluoroethylene-hexafluoropropylene copolymers, vinylidene fluoride-hexafluoropropylene copolymers (PVdF-HFP), vinylidene fluoride-tetrafluoroethylene copolymers, perfluoroalkyl vinyl ether copolymers, ethylene-tetrafluoroethylene copolymers, vinylidene fluoride-chlorotrifluoroethylene copolymers and ethylene-chlorofluoroethylene copolymers.

Suitable binders are especially polyvinyl alcohol and halogenated (co)polymers, for example polyvinyl chloride or polyvinylidene chloride, especially fluorinated (co)polymers such as polyvinyl fluoride and especially polyvinylidene fluoride and polytetrafluoroethylene.

Inventive cathodes may comprise 1 to 15% by weight of binder(s), referring to electrode active material. In other embodiments, inventive cathodes may comprise 0.1 up to less than 1% by weight of binder(s).

A further aspect of the present invention is a battery, containing at least one cathode comprising inventive electrode active material, carbon, and binder, at least one anode, and at least one electrolyte.

Embodiments of inventive cathodes have been described above in detail.

Said anode may contain at least one anode active material, such as carbon (graphite), $TiO_2$, lithium titanium oxide, silicon, lithium or tin. Said anode may additionally contain a current collector, for example a metal foil such as a copper foil.

Said electrolyte may comprise at least one non-aqueous solvent, at least one electrolyte salt and, optionally, additives.

Non-aqueous solvents for electrolytes can be liquid or solid at room temperature and is preferably selected from among polymers, cyclic or acyclic ethers, cyclic and acyclic acetals and cyclic or acyclic organic carbonates.

Examples of suitable polymers are, in particular, polyalkylene glycols, preferably poly-$C_1$-$C_4$-alkylene glycols and in particular polyethylene glycols. Polyethylene glycols can here comprise up to 20 mol % of one or more $C_1$-$C_4$-alkylene glycols. Polyalkylene glycols are preferably polyalkylene glycols having two methyl or ethyl end caps.

The molecular weight $M_w$ of suitable polyalkylene glycols and in particular suitable polyethylene glycols can be at least 400 g/mol.

The molecular weight $M_w$ of suitable polyalkylene glycols and in particular suitable polyethylene glycols can be up to 5000000 g/mol, preferably up to 2000000 g/mol.

Examples of suitable acyclic ethers are, for example, diisopropyl ether, di-n-butyl ether, 1,2-dimethoxyethane, 1,2-diethoxyethane, with preference being given to 1,2-dimethoxyethane.

Examples of suitable cyclic ethers are tetrahydrofuran and 1,4-dioxane.

Examples of suitable acyclic acetals are, for example, dimethoxymethane, diethoxymethane, 1,1-dimethoxyethane and 1,1-diethoxyethane.

Examples of suitable cyclic acetals are 1,3-dioxane and in particular 1,3-dioxolane.

Examples of suitable acyclic organic carbonates are dimethyl carbonate, ethyl methyl carbonate and diethyl carbonate.

Examples of suitable cyclic organic carbonates are compounds of the general formulae (III) and (IV)

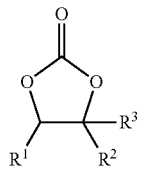

(III)

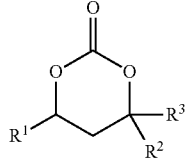

(IV)

where $R^1$, $R^2$ and $R^3$ can be identical or different and are selected from among hydrogen and $C_1$-$C_4$-alkyl, for example methyl, ethyl, n-propyl, isopropyl, n-butyl, isobutyl, sec-butyl and tert-butyl, with $R^2$ and $R^3$ preferably not both being tert-butyl.

In particularly preferred embodiments, $R^1$ is methyl and $R^2$ and $R^3$ are each hydrogen, or $R^1$, $R^2$ and $R^3$ are each hydrogen.

Another preferred cyclic organic carbonate is vinylene carbonate, formula (V).

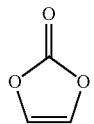

(V)

The solvent or solvents is/are preferably used in the water-free state, i.e. with a water content in the range from 1 ppm to 0.1% by weight, which can be determined, for example, by Karl-Fischer titration.

Electrolyte (C) further comprises at least one electrolyte salt. Suitable electrolyte salts are, in particular, lithium salts. Examples of suitable lithium salts are $LiPF_6$, $LiBF_4$, $LiClO_4$, $LiAsF_6$, $LiCF_3SO_3$, $LiC(C_nF_{2n+1}SO_2)_3$, lithium imides such as $LiN(C_nF_{2n+1}SO_2)_2$, where n is an integer in the range from 1 to 20, $LiN(SO_2F)_2$, $Li_2SiF_6$, $LiSbF_6$, $LiAlCl_4$ and salts of the general formula $(C_nF_{2n+1}SO_2)_tYLi$, where m is defined as follows:

t=1, when Y is selected from among oxygen and sulfur,
t=2, when Y is selected from among nitrogen and phosphorus, and
t=3, when Y is selected from among carbon and silicon.

Preferred electrolyte salts are selected from among $LiC(CF_3SO_2)_3$, $LiN(CF_3SO_2)_2$, $LiPF_6$, $LiBF_4$, $LiClO_4$, with particular preference being given to $LiPF_6$ and $LiN(CF_3SO_2)_2$.

In an embodiment of the present invention, batteries according to the invention comprise one or more separators by means of which the electrodes are mechanically separated. Suitable separators are polymer films, in particular porous polymer films, which are unreactive toward metallic lithium. Particularly suitable materials for separators are polyolefins, in particular film-forming porous polyethylene and film-forming porous polypropylene.

Separators composed of polyolefin, in particular polyethylene or polypropylene, can have a porosity in the range from 35 to 45%. Suitable pore diameters are, for example, in the range from 30 to 500 nm.

In another embodiment of the present invention, separators can be selected from among PET nonwovens filled with inorganic particles. Such separators can have porosities in the range from 40 to 55%. Suitable pore diameters are, for example, in the range from 80 to 750 nm.

Batteries according to the invention further comprise a housing which can have any shape, for example cuboidal or the shape of a cylindrical disk or a cylindrical can. In one variant, a metal foil configured as a pouch is used as housing.

Batteries according to the invention display a good discharge behavior, for example at low temperatures (zero ° C. or below, for example down to −10° C. or even less), a very good discharge and cycling behavior, in particular at high temperatures (45° C. or higher, for example up to 60° C.) in particular with respect to the capacity loss, and a good safety behavior at high temperatures such as 60° C. or more. Preferably, also the cycle stability and the C-rate capacity behavior are improved, or they are at least identical although the Li content is lower.

Batteries according to the invention can comprise two or more electrochemical cells that combined with one another, for example can be connected in series or connected in parallel. Connection in series is preferred. In batteries according to the present invention, at least one of the electrochemical cells contains at least one cathode according to the invention. Preferably, in electrochemical cells according to the present invention, the majority of the electrochemical cells contains a cathode according to the present invention. Even more preferably, in batteries according to the present invention all the electrochemical cells contain cathodes according to the present invention.

The present invention further provides for the use of batteries according to the invention in appliances, in particular in mobile appliances. Examples of mobile appliances are vehicles, for example automobiles, bicycles, aircraft or water vehicles such as boats or ships. Other examples of mobile appliances are those which move manually, for example computers, especially laptops, telephones or electric hand tools, for example in the building sector, especially drills, battery-powered screwdrivers or battery-powered staplers.

The invention is further illustrated by working examples. general remark: Residual LiOH and $Li_2CO_3$ may be determined as follows. 1 g of electrode active material is mixed with 40 mL of deionized water in a beaker and stirred for minutes. Then the aqueous phase is separated from the solid by using a syringe filter and added to a 100 mL beaker. 15 mL of deionized water is added and the obtained solution is titrated with a 0.1 M aqueous solution of hydrochloric acid. The amounts of LiOH and $Li_2CO_3$ in % by weight ($w_{(LiOH)}$ and $w_{(Li2CO3)}$) are calculated using the following equations.

$$w_{(LiOH)} = ((V_{EP1}-(V_{EP2}-V_{EP1})) \cdot C_{HCl} * t_{HCl} \cdot M_{LiOH} \cdot 100)/(m_{sample} \cdot 1000)$$

with
$V_{EP1}$ and $V_{EP2}$: volume at the inflection point/equivalence point in ml
$C_{HCl}$: concentration of the standard solution in mol/l
$t_{HCl}$: titer of the standard solution
$M_{LiOH}$: Molar Mass of LiOH (23.95 g/mol) in g/mol
$m_{sample}$: mass of sample in g (generated by reweighing)
100: conversion factor to get the result in g/100 g
1000: conversion factor to get the sample weight in mg
and $$w_{(Li2CO3)} = ((V_{EP2}-V_{EP1}) \cdot c_{HCl} \cdot t_{HCl} \cdot M_{Li2CO3} \cdot 100)/(m_{sample} \cdot 1000)$$

with
$V_{EP1}$ and $V_{EP2}$: volume at the inflection point/equivalence point in ml
$c_{HCl}$: concentration of the standard solution in mol/l
$t_{HCl}$: titer of the standard solution
$M_{Li2CO3}$: Molar Mass of $Li_2CO_3$ (73.89 g/mol) in g/mol
$m_{sample}$: mass of sample in g (generated by reweighing)
100: conversion factor to get the result in g/100 g
1000: conversion factor to get the sample weight in mg I. Manufacture of a Cathode Active Material I.1 Manufacture of a Precursor A stirred tank reactor was filled with deionized water and 49 g of ammonium sulfate per kg of water. The solution was tempered to 55° C. and a pH value of 12 was adjusted by adding an aqueous sodium hydroxide solution.

The co-precipitation reaction was started by simultaneously feeding an aqueous transition metal sulfate solution and aqueous sodium hydroxide solution at a flow rate ratio of 1.8, and a total flow rate resulting in a residence time of 8 hours. The transition metal solution contained Ni, Co and Mn sulfates at a molar ratio of 8.5:1.0:0.5 and a total transition metal concentration of 1.65 mol/kg. The aqueous sodium hydroxide solution was a 25 wt. % sodium hydroxide solution and 25 wt. % ammonia solution in a weight ratio of 6. The pH value was kept at 12 by the separate feed of an aqueous sodium hydroxide solution. Beginning with the start-up of all feeds, mother liquor was removed continuously. After 33 hours all feed flows were stopped. The mixed transition metal (TM) oxyhydroxide precursor was obtained by filtration of the resulting suspension, washing with distilled water, drying at 120° C. in air and sieving.

I.2 Lithiated Cathode Active Material (CAM)

The mixed transition metal (TM) oxyhydroxide precursor obtained as described above (transition metal composition $Ni_{0.85}Co_{0.1}Mn_{0.05}$) was mixed with $Al_2O_3$ to obtain a concentration of 0.3 mole-% Al relative to Ni+Co+Mn+Al, and with LiOH monohydrate to obtain a Li/(TM+Al) molar ratio of 1.06. The resultant mixture was heated to 760° C. and kept for 10 h in a forced flow of a mixture of 60% oxygen and 40% nitrogen (by volume). After cooling to ambient temperature the powder was deagglomerated and sieved through a 32 µm mesh to obtain the Al-doped base CAM.1.

II. Treatment of CAM.1 with Water

II.1 Treatment of CAM.1 According to the Present Invention

CAM.1 was added to demineralized water at ambient temperature in a weight ratio of 1.33 (CAM.1:water). After a 3 minute stirring of the resultant slurry the liquid was immediately removed by filtration through a Buchner funnel. The filter cake so obtained was dried at 40° C. in a membrane pump vacuum overnight followed by a $2^{nd}$ drying step at 200° C. for 14 hours in membrane pump vacuum as well. CAM.1-W was obtained. The pH value of the filtrate was 12.46.

Even better results are obtained if the water treatment is performed on a Buchner funnel for three minutes, and then filtration is started.

Even better results are obtained if the water treatment is performed on a Buchner funnel for three minutes, and filtration is started simultaneously the water treatment, that is, water addition and removal of said aqueous medium are started simultaneously.

II.2 Comparative Treatment

Example II.1 was repeated but the stirring lasted 35 minutes before filtration was commenced. C-CAM.1-W was obtained. The pH value of the filtrate was 12.50.

TABLE 1

Residual Li values obtained by titration and electrochemical performance of Examples II.1 and II.21

| Sample | LiOH (wt.-%) | $Li_2CO_3$ (wt.-%) | 0.1 C discharge capacity [mAh/g] | Resistance ($\Omega \cdot cm^2$) |
|---|---|---|---|---|
| CAM.1-W | 0.0753 | 0.2778 | 186.6 | 166.0 |
| C-CAM.1-W | 0.0743 | 0.3252 | 183.4 | 199.1 |

Determination of residual LiOH and $Li_2CO_3$ has been carried out as described above.

The electrochemical testing was carried out in coin half cells according to the following procedure to obtain a 0.1 C discharge capacity and a resistance as depicted in Table 1.

To produce a cathode, the following ingredients were blended under stirring with one another until a lump-free paste was obtained:

Electrode active material, a 10 wt.-% solution of polyvinylidene difluoride ("PVdF"), commercially available as Kynar HSV 900 from Arkema Group, dissolved in N-ethylpyrrolidone (NEP), carbon black, BET surface area of 62 m²/g, commercially available as "Super C 65" from Imerys, graphite, commercially available as "SFG6L" from Imerys and additional NEP to obtain a solid content of 62% and a ratio of electrode active material:carbon:graphite:PVdF of 93:1.5:2.5.3 by weight.

Cathodes were prepared as follows: On a 20 µm thick aluminum foil, the above paste was applied with a doctor blade followed by drying and calendaring to obtain about a loading of 10.3 mg/cm² and a density of 3.47 g/cm³. Disc-shaped cathodes were punched out of the foil. The cathode discs were then weighed, dried for 16 hours in a vacuum oven at 105° C. and introduced into an argon glove box without exposure to ambient air. Then, cells with the cathodes were built.

Electrochemical testing was conducted in coin-type cells. The electrolyte used was a 1 M solution of $LiPF_6$ in dimethyl carbonate/ethylene carbonate (weight ratio 1:1).

Anode: lithium, separated from the cathode by a glass-fiber separator.

The coin cells are charged and discharged in a voltage range from 3.0 to 4.3V. After two cycles at a C-Rate of 0.1 C for charge and discharge and five cycles at 0.5 C charge and 0.2 C discharge the 0.1 C discharge capacity according to Table 1 is obtained by 0.5 C charge and 0.1 C discharge in the $8^{th}$ cycle.

Starting from the 9th cycle the following charge/discharge cycles are carried out until the $19^{th}$ cycle is reached: 0.5 C/0.2 C, 0.5 C/0.5 C, 0.5 C/1 C, 0.5 C/2 C, 0.5 C/3 C, 0.5 C/5 C, 0.5 C/7 C, 200.5 C/10 C, 0.5 C/0.5 C and 0.5 C/0.2 C.

In the $19^{th}$ cycle the cell is charged at 0.5 C and discharged with 0.2 C for 30 seconds. Then a 2 C discharge pulse is applied for 10 seconds. From the voltage drop observed during this pulse (E(0 s)-E(10 s)) the resistance according to Table 1 (R) is calculated according to the following formula.

$$R = (E(0\ s) - E(10\ s))/I(10\ s) \cdot electrode\ area$$

with

I(10 s) being the current during the 2 C pulse lasting for 10 seconds.

The reduced capacity and the increased resistance which is found by this method for the comparative treatment in comparison to the inventive treatment is reflecting a more pronounced damage of the cathode material caused by the comparative treatment.

If performed on larger scale, Example II.1 may be performed in a suction filter with stirrer.

The invention claimed is:

1. A process for modifying an electrode active material of formula $Li_{1+x}TM_{1-x}O_2$, wherein TM is a combination of metals of formula (I a) or (I b)

$$(Ni_aCo_bMn_c)_{1-d}M^1_d \quad \text{(I a)}$$

wherein a+b+c=1, a is in the range of from 0.75 to 0.95, b is in the range of from 0.025 to 0.2, c is in the range of from 0.025 to 0.2, d is in the range of from zero to 0.1, $M^1$ is at least one of Ba, Mg, Al, W, Mo, Ti, and Zr, and x is in the range of from −0.05 to +0.2, and $$(Ni_aCo_bAl_e)_{1-d}M^2_d \quad \text{(I b)}$$

wherein a+b+c=1, a is in the range of from 0.75 to 0.95, b is in the range of from 0.025 to 0.2, e is in the range of from 0.025 to 0.2, d is in the range of from zero to 0.1, and $M^2$ is at least one of W, Mo, Ti, and Zr, wherein said process comprises:
(a) treating said $Li_{1+x}TM_{1-x}O_2$ with an aqueous medium with a pH value in the range of at least 5 to up to 14, and
(b) removing said aqueous medium from treated $Li_{1+x}TM_{1-x}O_2$ by way of a solid-liquid separation, and wherein the treating (a) and the removing (b) are carried out simultaneously.

2. The process according to claim 1, wherein the treating (a) and the removing (b) are performed in a filter device having a stirrer or in a centrifuge.

3. The process according to claim 2, wherein the removing (b) is performed with a pressure filter or suction filter having a stirrer.

4. The process according to claim 1,
wherein the aqueous medium in the treating (a) comprises from 0.001 to 10% by weight of an oxide, hydroxide or oxyhydroxide of Al, Mo, W, Ti, or Zr.

5. The process according to claim 1, wherein TM is a combination of metals of formula (I a)

$$(Ni_aCo_bMn_c)_{1-d}M^1_d \qquad (I\ a)$$

wherein a+b+c=1,
a is in the range of from 0.75 to 0.95,
b is in the range of from 0.025 to 0.2,
c is in the range of from 0.025 to 0.2,
d is in the range of from zero to 0.1, and
$M^1$ is at least one of Al, W, Mo, Ti, and Zr.

6. The process s according to claim 1, wherein TM is a combination of metals of formula (I b)

$$(Ni_aCo_bAl_e)_{1-d}M^2_d \qquad (I\ b)$$

wherein a+b+c=1,
a is in the range of from 0.75 to 0.95,
b is in the range of from 0.025 to 0.2,
e is in the range of from 0.025 to 0.2,
d is in the range of from zero to 0.1, and
$M^2$ is at least one of W, Mo, Ti, and Zr.

7. The process according to claim 1, wherein said process further comprises:
(c) thermally treating a material treated in the treating (a) and removing (b) at a temperature in the range of from 350 to 900° C.

8. The process according to claim 1, wherein the aqueous medium has pH value of at least 5 and up to 14 at the beginning of the treating (a).

* * * * *